Harold L. Fitch
INVENTOR.

Feb. 24, 1959     H. L. FITCH     2,874,673
FILM MOUNT ADHESIVE LIQUID APPLICATOR
Filed May 17, 1957     3 Sheets-Sheet 2
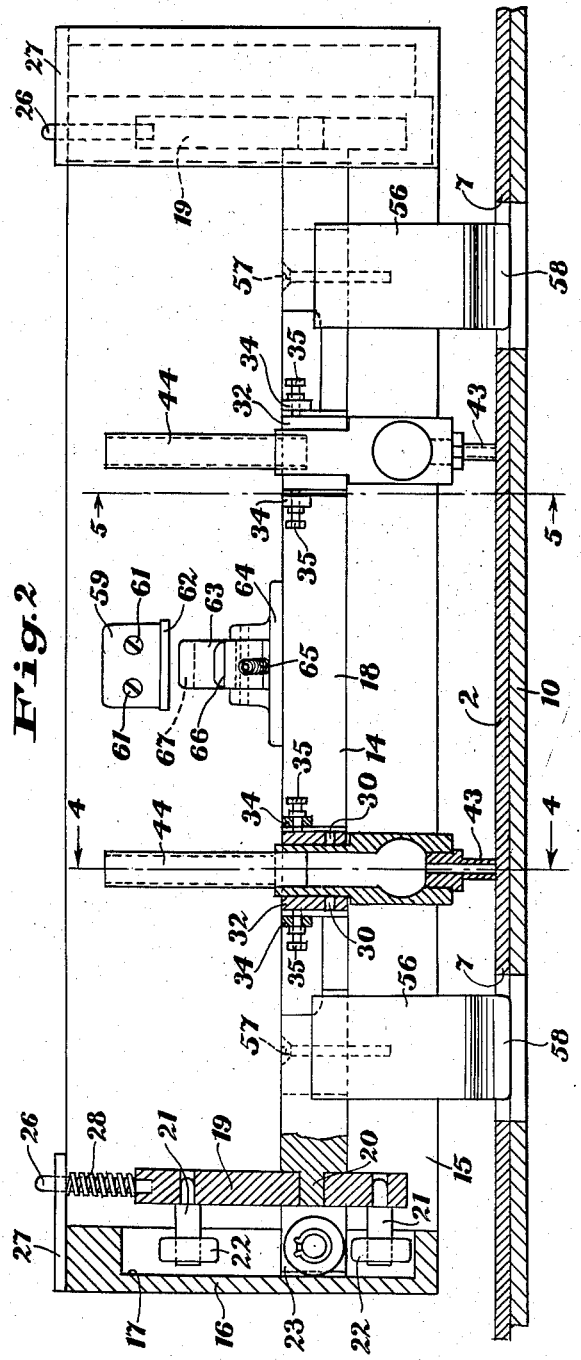
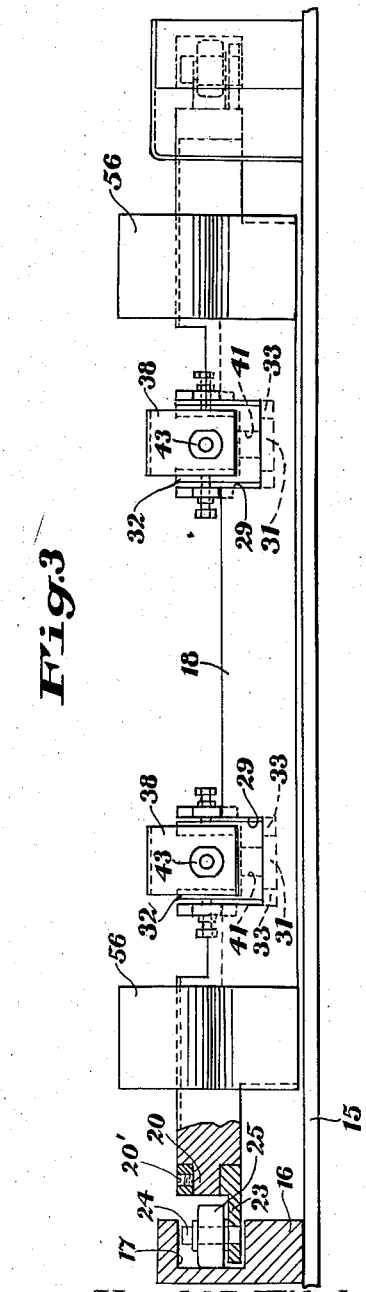
Harold L. Fitch
INVENTOR.
BY Daniel L. Mayne
Steve W. Gremban
ATTORNEYS

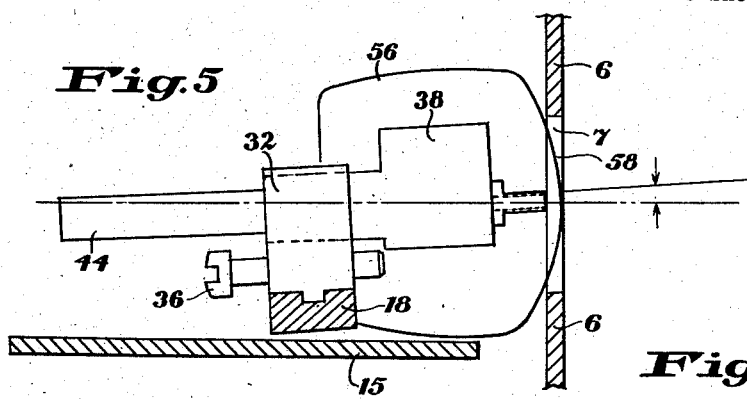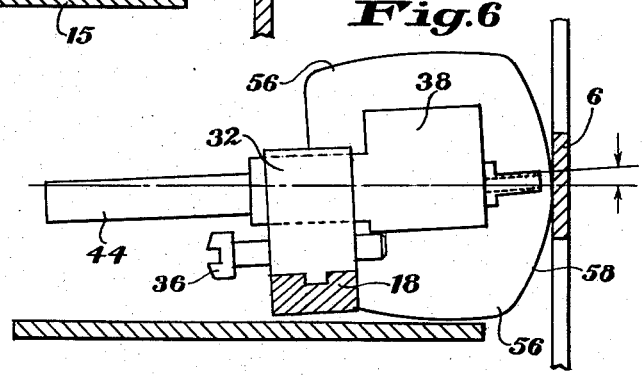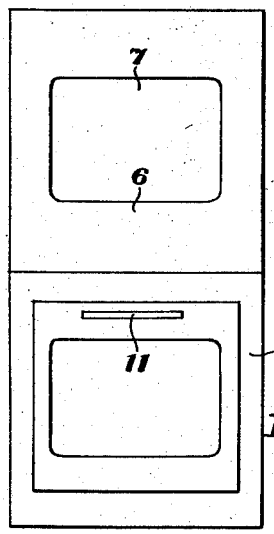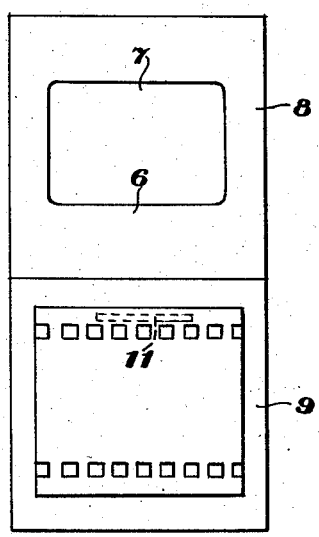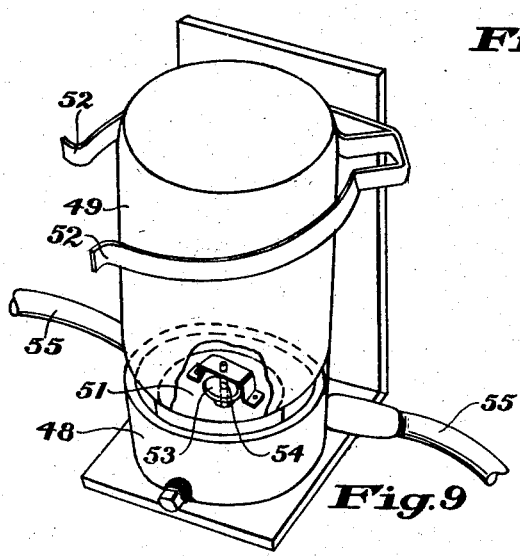

United States Patent Office

2,874,673
Patented Feb. 24, 1959

2,874,673

FILM MOUNT ADHESIVE LIQUID APPLICATOR

Harold L. Fitch, Rochester, N. Y., assignor to Eastman Kodak Company, Rochester, N. Y., a corporation of New Jersey Application May 17, 1957, Serial No. 659,808

10 Claims. (Cl. 118—2)

This invention relates generally to an applicator mechanism, and more specifically to an adhesive-applicator mechanism actuable by one of two longitudinal rows of alternate ribs and apertures formed by a moving web of film mount stock material to apply an adhesive liquid strip adjacent and parallel to one side of each of the apertures in the other row.

In the mounting of film transparencies, it is customary to use a film mount formed from a single piece of cardboard which is scored along its center line to provide two hinged flaps or members which are adapted to be arranged in overlapping relation with the transparency positioned or sandwiched therebetween. The members are provided with registering apertures which are of sufficient size to frame the image area of the transparency. The balance of the transparency extends beyond the edges of the apertures and is surrounded by an adhesive spacer element secured to the marginal edges of one of the flaps. The flaps are of larger dimensions than the transparency so as to extend beyond all sides of the latter, as is well known. When semiautomatic machines are used for mounting a film transparency within a film mount of the foregoing type, it is necessary to tack the transparency in an operative position in the transparency receiving space framed by the spacer element before the mount is folded and sealed. The tacking is necessary to assure that the entire picture-bearing area of the transparency is viewable through the apertures, and to eliminate the possibility of an undesired portion of the transparency beyond the picture area appearing in the aperture viewing area. The tacking also eliminates any possible twisting or skewing of the transparency prior to sealing which would otherwise result in improper orientation of the transparency with respect to the apertures. This tacking operation has normally been accomplished in the past by applying an adhesive liquid strip along one entire edge of the web of film before the web is cut into individual transparencies. This edge coating of film with an adhesive is undesirable in that it adds an additional step or operation in preparing the film for mounting. To minimize this disavantage, the edge coating of the film is sometimes combined with the lacquering operation of film manufacture. However, in such situations, the edge coating of the film tends to be the slowest part of the operation and consequently limits the output of the lacquering machine.

Therefore, one of the objects of the present invention is to provide an improved applicator mechanism adapted to apply an adhesive liquid strip to a film mount that eliminates all the disadvantages of prior known methods or mechanisms.

Another object of the invention is to provide an improved mechanism for applying an adhesive liquid strip adjacent and parallel to one edge of one of the apertures of a film mount that considerably reduces the amount of adhesive used resulting in a considerable reduction in the cost of mounting a film transparency.

A further object of the invention is the provision of an adhesive-applicator mechanism adapted to apply an adhesive liquid strip to a film mount during the high-speed operation of punching and cutting of the mounts from a web of film-mount stock material.

Still another object of the invention is the provision of an adhesive applicator mechanism having means for adjustably varying the angle of inclination of a nozzle with respect to the horizontal.

And another object of this invention is to provide an adhesive applicator mechanism having means for adjusting the position of a nozzle laterally and transversely of a support bar.

Still another object of the invention is the provision of an adhesive applicator mechanism having a nozzle mount removably secured to a support bar to facilitate removal of the mount for cleaning.

A more specific object of this invention is the provision of an adhesive-applicator mechanism actuable by one of two longitudinal rows of alternate ribs and apertures formed by a moving web of film-mount stock material to apply an adhesive liquid strip adjacent and parallel to one edge of each of the apertures in the other row.

Objects and advantages other than those set forth above will be apparent from the following description when read in connection with the accompanying drawing, in which:

Fig. 2 is a plan view partly in section of the adhesive-applicator mechanism;

Fig. 3 is a front elevation view partly in section of the structure of Fig. 2;

Fig. 5 is a view partly in section taken along line 5—5 of Fig. 2;

Fig. 6 is a view similar to Fig. 5 showing the cam follower of the mechanism in engagement with the film mount stock material and the nozzle in a retracted position;

Fig. 7 is a front elevation view showing the completed film mount and the adhesive liquid strip adjacent and parallel to one edge of one of the apertures;

Fig. 8 is a view similar to Fig. 7 showing a film transparency tacked to the film mount;

Fig. 9 is a perspective view showing an adhesive container for feeding adhesive to the nozzle of the adhesive applicator mechanism.

Figure 1:
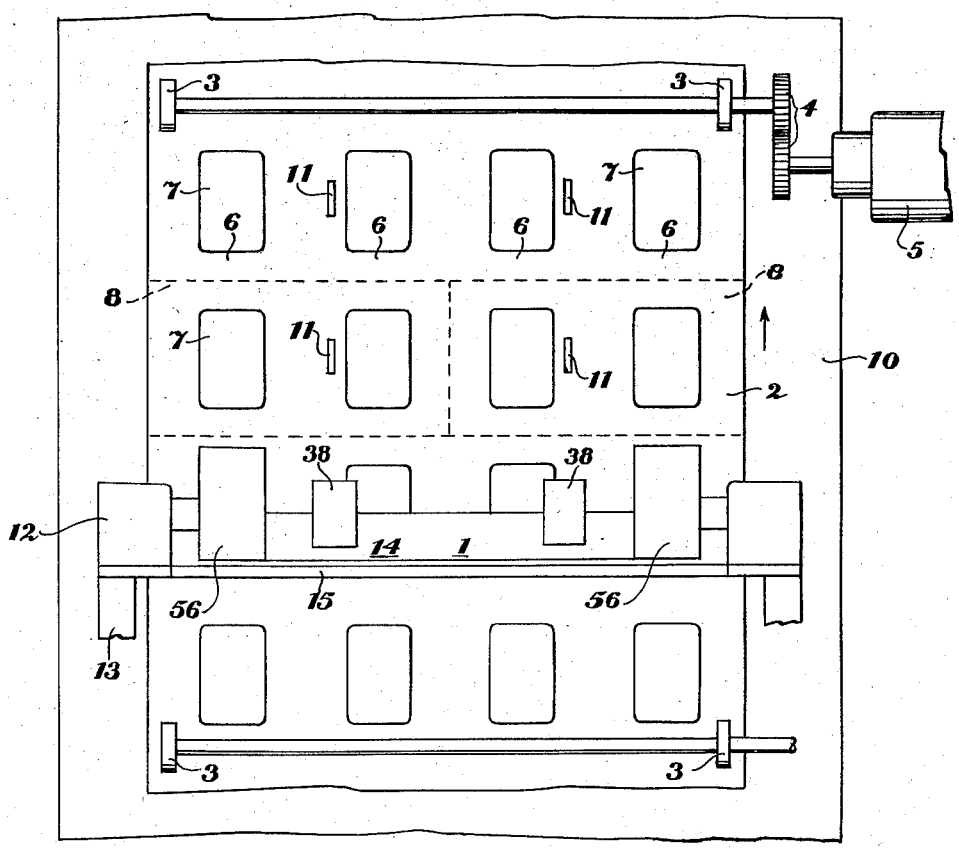
Fig. 1 is a front elevation view of the structure of this invention showing an adhesive-applicator mechanism operatively connected to and actuable by a moving web of film-mount stock material to place an adhesive liquid strip thereon.

As shown in the drawings, this invention is embodied in an adhesive-applicator mechanism shown generally at 1 disposed normal to and adapted to intermittently engage one side of a vertically disposed web or sheet 2 of base film mount stock, such as jute stock. Movement is imparted to the web 2 in the direction indicated by the arrow in Fig. 1 by means of spaced apart rollers 3 drivingly connected by gears 4 to a drive motor 5, although any other suitable means for imparting movement to the web may be used. The web 2 of film mount stock material has previously been subjected to a die-cutting operation, not shown, to provide the stock material with longitudinal rows of alternate ribs 6 and apertures 7. In this particular instance, the web 2 has four longitudinal rows of ribs 6 and apertures 7 and each transverse row of apertures on the web is adapted to yield two film mounts 8, after slitting and chopping, as shown dotted in Fig. 1 and in finished form including an adhesive spacer element 9 in Figs. 7 and 8. Although four longitudinal rows of ribs 6 and apertures 7 are shown, the web 2 may contain any number of rows that is a multiple of two. The adhesive-applicator mechanism 1 is actuated by the ribs 6 and apertures 7 of one longitudinal row as the web is moved to intermittently apply an adhesive liquid strip 11 adjacent and parallel to one edge of each aperture in an adjacent row. Since each film mount 8 uses two apertures 7, the adhesive strip 11 need be applied only along one edge of each pair of apertures 7 in a transverse row. A stationary backing plate 10 is provided on the opposite side of the web to support the web and prevent movement thereof when engaged by the applicator mechanism 1. The adhesive-applicator mechanism 1 of this invention is particularly adapted for use in connection with an apparatus for producing mounts for film transparencies such as disclosed in the British Patent No. 749,236 in which the film mount stock material is moved therethrough at a high rate of speed.

The adhesive-applicator mechanism 1 of this invention comprises a stationary member 12 mounted on a suitable rigid support element 13, shown broken off, and adapted to support a reciprocally movable member 14. The stationary member 12 has a base 15 which is provided at each end with a rectangular bearing support bar 16 as seen in Figs. 2 and 3 having an elongated groove to form a bearing race 17. The movable member 14 comprises a longitudinally extending, rectangularly shaped support bar 18 parallel to said web 2 having a cylindrical dowel 20 at each end insertable in a corresponding opening of a bearing rod 19 as seen in Fig. 3. The bar 18 may be angularly turned with respect to the rods 19 for a purpose to be explained hereinafter, and adjustably secured thereto in any selected position by set screws 20'. Each of the rods 19 is provided with spaced-apart, horizontally extending bearing studs 21 transverse thereto for supporting roller bearings 22. Intermediate the studs 21, the support rod 19 is provided with a flange 23 carrying a vertically extending bearing stud 24 for supporting a roller bearing 25. The bearings 22, 25 are received by the race 17 which supports and guides the rods 19 for reciprocal movement therein in a horizontal plane. Each of the bearing rods 19 is provided with a guide pin 26 extending through an opening formed by an end plate 27 secured to the race 17. Spiral springs 28 are carried by the guide pins 26 and are interposed between the end plate 27 and the support rod 19.

Figures 4, 10:
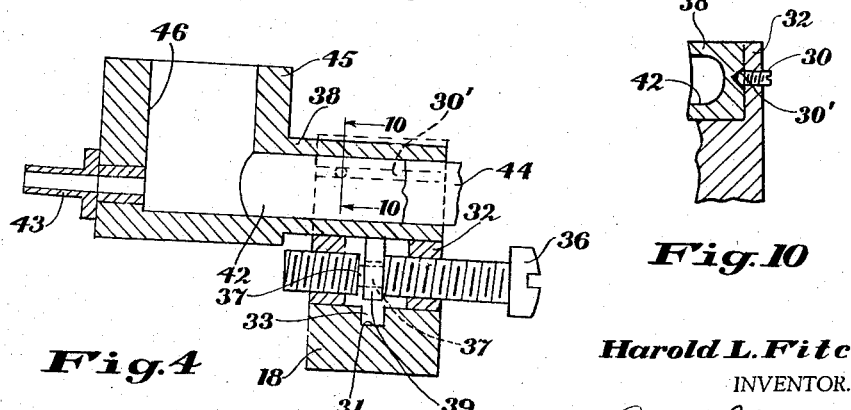
Fig. 4 is a section view taken along line 4—4 of Fig. 2.
Fig. 10 is an enlarged segmental view taken on line 10—10 of Fig. 4.

The longitudinal support bar 18 further has a pair of spaced-apart grooves 29 as seen in Fig. 3 transverse to the axis of the bar 18, and a keyway 31 as seen in Fig. 4 parallel to the axis of the bar extending across each groove 29. A channel support element 32 is received by each groove 29 and has spaced-apart keys 33 along the underside portion cooperating with the keyway 31. Flanges 34 are provided by the bar 18 disposed along the sides of the grooves 29, and each flange 34 has a horizontally disposed stud 35 whose end is adapted to engage one of the sides of the support element 32 when the stud 35 is turned. The flanges 34 and studs 35 provide an adjustment means for varying the lateral positioning of the support element 32. The support element 32 has axial threaded openings formed by the base thereof for receiving an adjustment screw 36 having a portion 37 of reduced diameter intermediate its ends as seen in Fig. 4. The channel support element 32 further has detents 30 for engaging V-shaped grooves 30' of a nozzle mount 38 to removably secure the mount to the element 32 as seen in Fig. 10. This provides a nozzle mount that may be readily removed from the support element 32 for periodic cleanings without necessitating extensive dismantling of the equipment. The nozzle mount 38 has a forked projection 39 depending therefrom insertable through a central opening 41 shown dotted in Fig. 3 in the base of the support element 32 and into engagement with the reduced portion 37 of the screw 36. Turning the screw 36 tends to adjustably move the projection 39 and nozzle mount 38 transversely with respect to the support element 32 and bar 18 in a direction toward or away from the web 2.

The nozzle mount 38 has an axial opening 42 therethrough threaded at one end to receive a nozzle 43 and adapted at the other end to receive a tube 44 press-fitted therein. The nozzle mount 38 further has a reservoir 45 provided with a central opening 46 transverse to and connected with the opening 42. The reservoir opening 46 is exposed to atmosphere so that the pressure of the liquid adhesive supplied to the nozzle 43 is of a relatively constant value, limited to the pressure head of the liquid adhesive in the reservoir 45.

The bar 18 is angularly turned with respect to the bearing rods 19 and secured thereto by the set screws 20' as mentioned heretofore. The nozzle mounts 38 supported by the bar 18 are accordingly inclined with respect to the horizontal as shown exaggerated in Figs. 4, 5, and 6 depending upon the angle through which the bar is turned. By adjusting the inclination of the nozzle 43 with respect to the horizontal, it is possible to control the heaviness or depth of thickness of the adhesive strip 11; the depth of the strip increasing as the angle increases. Also, the inclination of the nozzle 43 with respect to the horizontal prevents a wiping action of the nozzle end engaging the web 2 such as occurs when the nozzle 43 is disposed normal to the web. A wiping action is detrimental in that it prevents the disposition of an adhesive liquid strip 11 on the web 2.

The nozzle mount 38 receives the adhesive liquid from a constant supply container 48 of a well known type including a bottle 49 having a valve mechanism 51 detachably secured to the end of the bottle. The bottle 49 is slidably mounted in spaced apart spring arms 52 carried by the container 48 with the valved end of the bottle disposed within the container as seen in Fig. 9. A valve disc 53 prevents the flow of adhesive liquid until the bottle 49 is slidably moved downwardly causing the valve plunger 54 to engage and be urged upwardly by the base of the container 48 raising the valve disc 53 and releasing the liquid from the bottle into the container. Since the diameter of the bottle opening is less than the diameter of the container opening, the adhesive liquid in the container 48 is exposed to atmospheric pressure and will accordingly rise to a fixed or constant level. The adhesive liquid is supplied to the nozzle mounts 38 through any suitable conduits 55 adapted to connect the container 48 to the tubes 44. Since the adhesive liquid in the reservoir 45 rises to a level equal to the level of the liquid in the container 48, the level of the liquid in the reservoir 45 may readily be controlled by vertically moving the container 48 upwardly to raise the level in the reservoir and downwardly to lower it. This provides a fine control over the level of the liquid in the reservoir 45 and once established maintains the level of the liquid constant as long as the container is fixed.

A pair of spaced-apart, cam follower members 56, each formed from a single piece of nylon are rigidly secured by screws 57 shown dotted in Fig. 2 to the bar. The front portions of the cam followers 56 are provided with a substantially convex cam surface 58 adapted to engage the film mount web 2. Although two cam followers 56 and nozzle mounts 38 are shown in Figs. 2 and 3, it should be obvious that any number of cam followers and nozzle mounts can be used depending on the width of the web and the number of pairs of longitudinal rows of ribs and apertures formed thereby. If a web is used having only one pair of rows, only one cam follower 56 and nozzle mount 38 is needed.

A releasable latch device for locking the movable member 14 in a retracted position when the applicator 1 is not being used is provided as seen in Fig. 2 comprising a flange 59 secured to the base by screws 61 and having an upturned lip 62. An L-shaped member 63 is pivotally mounted intermediate its ends to a support element 64 carried by the bar 18. A spiral spring 65 is interposed between a handle 66 of the L-shaped member 63 and the support element 64 causing the other end of the L-shaped member to be urged downwardly with a hook 67 thereon, shown dotted in Fig. 2, engaging the lip 62. The movable member 14 is released by urging the handle 66 in a direction depressing the spring 65 and withdrawing the hook 67 from the lip 62.

In the operation of this invention, the adhesive-applicator mechanism 1 is mounted transverse to the vertically disposed web 2 of film mount stock material moving in the direction of the arrow as shown in Fig. 1. Each of the cam followers 56 is in register with a longitudinal row of alternate ribs 6 and apertures 7 formed by the web 2. The nozzle mount 38 is properly positioned with respect to the web by the studs 35 and adjustment screw 36 so that the nozzle 43 will place the adhesive liquid strip 11 in the proper position adjacent and parallel to one edge of each pair of apertures 7 in a transverse row. As the web 2 of stock material is moved upwardly, the cam followers 56 will alternately pass over the ribs 6 and the apertures 7. When the cam follower 56 is passing over the rib 6, the movable member 14 will be urged in a direction against the bias of the springs 28 to hold the nozzles 43 out of engagement with the web 2 of stock material as shown in Fig. 6. When the cam follower 56 passes over the aperture 7, the springs 28 force the movable member 14 toward the web 2 of stock material until the nozzles 43 engage the web stopping any further forward movement of the member as seen in Fig. 5. The moving web 2 tends to draw out the adhesive from the nozzles 43 by capillary action and is materially aided by the inclination of the nozzles with respect to the horizontal. The configuration of the cam surface 58 of the cam follower 56 in combination with the adjustment screw 36 controls the length of the adhesive liquid strip 11 applied to the web.

Although but one embodiment has been illustrated and described, it will be apparent to those skilled in the art that various changes and modifications may be made therein without departing from the spirit of the invention or from the scope of the appended claims.

It is claimed and desired to secure by Letters Patent:

1. In an adhesive-applicator mechanism actuable by one of two longitudinal rows of alternate ribs and apertures formed by a vertically moving web of transparency mount stock material to apply an adhesive liquid strip adjacent and parallel to one edge of each of said apertures in said other row, the combination of: a base; a longitudinal member parallel to said web and mounted on said base for reciprocal movement toward and away from said web; a container adapted to hold a supply of adhesive liquid; a nozzle adjustably carried by said member and connected to said container for receiving the adhesive liquid therefrom; a cam follower mounted on said member in register with said one longitudinal row of alternate ribs and apertures, said cam follower being laterally spaced from said nozzle; means for imparting movement to said web of stock material; and resilient means interposed between said member and said base for biasing said member toward said web with said cam follower engaging said moving web whereby a reciprocal movement is imparted to said cam follower and said member by said one longitudinal row of alternate ribs and apertures causing said nozzle to intermittently engage said web and apply an adhesive liquid strip adjacent and parallel to one edge of each of said apertures in said other row.

2. In an adhesive-applicator mechanism actuable by one of two longitudinal rows of alternate ribs and apertures formed by a vertically moving web of transparency mount stock material to apply an adhesive liquid strip adjacent and parallel to one edge of each of said apertures in said other row, the combination of: a base, a longitudinal member parallel to said web and mounted on said base for reciprocal movement in a horizontal plane toward and away from said web; a container adapted to hold a supply of adhesive liquid; a nozzle carried by said member and connected to said container for receiving the adhesive liquid therefrom; adjusting means provided by said member for adjustably moving and securing said nozzle with its axis inclined at an angle with respect to the horizontal plane; a cam follower mounted on said member in register with said one longitudinal row of alternate ribs and apertures, said cam follower being laterally spaced from said nozzle; means for imparting movement to said web of stock material; and resilient means interposed between said member and said base for biasing said member toward said web with said cam follower engaging said moving web whereby a reciprocal movement is imparted to said cam follower and said member by said one longitudinal row of alternate ribs and apertures causing said nozzle to intermittently engage said web and apply an adhesive liquid strip adjacent and parallel to one edge of each of said apertures in said other row.

3. In an adhesive-applicator mechanism actuable by one of two longitudinal rows of alternate ribs and apertures formed by a vertically moving web of transparency mount stock material to apply an adhesive liquid strip adjacent and parallel to one edge of each of said apertures in said other row, the combination of: a base having a bearing support race at each end thereof; a longitudinal member parallel to said web and having bearings at each end thereof receivable by said races for reciprocal movement of said member toward and away from said web in a horizontal plane; a container adapted to hold a supply of adhesive liquid; a nozzle carried by said member and connected to said container for receiving the adhesive liquid therefrom; adjusting means provided by said member for adjustably moving and securing said nozzle with its axis inclined at an angle with respect to the horizontal plane; a cam follower mounted on said member in register with said one longitudinal row of alternate ribs and apertures, said cam follower being laterally spaced from said nozzle; means for imparting movement to said web of stock material; and resilient means interposed between said member and said base for biasing said member toward said web with said cam follower engaging said moving web whereby a reciprocal movement is imparted to said cam follower and said member by said one longitudinal row of alternate ribs and apertures causing said nozzle to intermittently engage said web and apply an adhesive liquid strip adjacent and parallel to one edge of each of said apertures in said other row.

4. In an adhesive-applicator mechanism actuable by one of two longitudinal rows of alternate ribs and apertures formed by a vertical moving web of transparency mount stock material to apply an adhesive liquid strip adjacent and parallel to one edge of each of said apertures in said other row, the combination of: a base having a bearing support race at each end thereof; a longitudinal member parallel to said web and having bearings at each end thereof receivable by said races for reciprocal movement of said member toward and away from said web in a horizontal plane; a container adapted to hold a supply of adhesive liquid; a nozzle adjustably carried by said member and connected to said container for receiving the adhesive liquid therefrom; a cam follower mounted on said member in register with said one longitudinal row of alternate ribs and apertures and having a cam surface facing said web, said cam follower being laterally spaced from said nozzle; means for imparting movement to said web of stock material; and a spring interposed between said member and said base for biasing said member toward said web with said cam follower engaging said moving web whereby a reciprocal movement is imparted to said cam follower and said member by said one longitudinal row of alternate ribs and apertures causing said nozzle to intermittently engage said web and apply an adhesive liquid strip adjacent and parallel to one edge of each of said apertures in said other row.

5. In an adhesive-applicator mechanism actuable by one of two longitudinal rows of alternate ribs and apertures formed by a vertically moving web of transparency mount stock material to apply an adhesive liquid strip adjacent and parallel to one edge of each of said apertures in said other row, the combination of: a base having a bearing support race at each end thereof; a longitudinal member parallel to said web and having bearings at each end thereof receivable by said races for reciprocal movement of said member toward and away from said web in a horizontal plane; a container adapted to hold a supply of adhesive liquid; a nozzle carried by said member and connected to said container for receiving the adhesive liquid therefrom; adjusting means provided by said member for adjustably moving and securing said nozzle with its axis inclined at an angle with respect to the horizontal plane; a cam follower mounted on said member in register with said one longitudinal row of alternate ribs and apertures and having a substantially convex cam surface facing said web, said cam follower being laterally spaced from said nozzle; means for imparting movement to said web of stock material; and a spring interposed between said member and said base for biasing said member toward said web with the cam surface of said cam follower engaging said moving web whereby a reciprocal movement is imparted to said cam follower and said member by said one longitudinal row of alternate ribs and apertures causing said nozzle to intermittently engage said web and apply an adhesive liquid strip adjacent and parallel to one edge of each of said apertures in said other row.

6. In an adhesive-applicator mechanism actuable by one of two longitudinal rows of alternate ribs and apertures formed by a vertically moving web of transparency mount stock material to apply an adhesive liquid strip adjacent and parallel to one edge of each of said apertures in said other row, the combination of: a base having a bearing support race at each end thereof; a longitudinal member parallel to said web and having bearing means at each end thereof receivable by said races for reciprocal movement of said member toward and away from said web in a horizontal plane; a container adapted to hold a supply of adhesive liquid; a nozzle removably secured to said member and connected to said container for receiving the adhesive liquid therefrom; first adjusting means provided by said member for adjustably moving and securing said nozzle with its axis inclined at an angle with respect to the horizontal base; second adjusting means carried by said member for adjustably moving said nozzle transversely and laterally of said member to properly position said nozzle with respect to said web; a cam follower mounted on said member in register with said one longitudinal row of alternate ribs and apertures; means for imparting movement to said web of stock material; and a spring interposed between said member and said base for biasing said member toward said web with said cam follower engaging said moving web whereby a reciprocal movement is imparted to said cam follower and said member by said one longitudinal row of alternate ribs and apertures causing said nozzle to intermittently engage said web and apply an adhesive liquid strip adjacent and parallel to one edge of each of said apertures in said other row.

7. The invention as defined in claim 6 wherein locking means are provided mounted in part on said base and in part on said member for holding said member in a retracted position against the bias of said spring with said nozzles out of engagement with said web when said applicator is not being used.

8. The invention as defined in claim 6 wherein said first adjusting means comprises a cylindrical dowel formed by said longitudinal member adapted to be received by said bearing means so that said member may be adjustably turned to a selected position with respect to said bearing means, and a set screw to secure said member to said bearing means in the selected position.

9. The invention as defined in claim 6 wherein said second adjusting means comprises spaced apart studs having said nozzle interposed therebetween and adapted to be laterally moved by said studs, a forked projection depending from said nozzle, and a screw carried by said member having a reduced portion receiving said forked projection and adapted when turned to adjustably move said nozzle transversely of said member.

10. The invention as defined in claim 6 wherein said longitudinal member has a detent, and said nozzle has a V-shaped groove adapted to receive said detent to removably secure said nozzle to said member.

References Cited in the file of this patent
UNITED STATES PATENTS

| | | |
|---|---|---|
| 401,771 | Bain | Apr. 23, 1889 |
| 1,151,596 | Jagenberg | Aug. 31, 1915 |
| 2,368,520 | Burckhardt et al. | Jan. 30, 1945 |
| 2,608,949 | Pascotti | Sept. 2, 1952 |
| 2,776,224 | Cote | Jan. 1, 1957 |